Nov. 8, 1960     E. J. KLEIN     2,959,053
FLOW MEASURING APPARATUS FOR HYDRAULIC SOLIDS
Filed Nov. 14, 1955
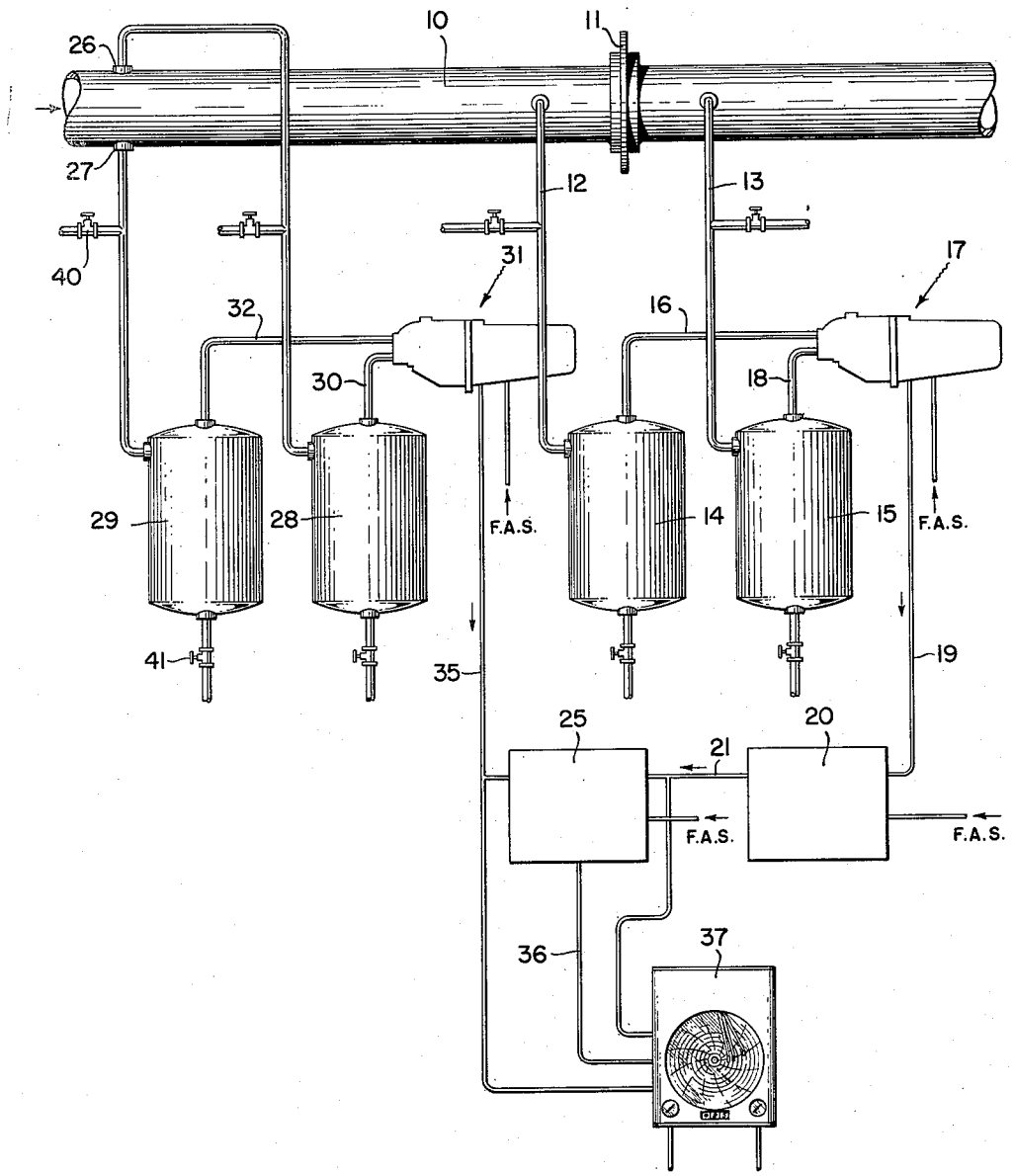
INVENTOR.
EDWARD J. KLEIN
BY
ATTORNEY.

United States Patent Office 2,959,053
Patented Nov. 8, 1960

2,959,053

FLOW MEASURING APPARATUS FOR HYDRAULIC SOLIDS

Edward J. Klein, Glenside, Pa., assignor to Minneapolis-Honeywell Regulator Company, Minneapolis, Minn., a corporation of Delaware Filed Nov. 14, 1955, Ser. No. 546,408

2 Claims. (Cl. 73—194)

A general object of the present invention is to provide a new and improved apparatus for measuring the amount of a material flowing through a flow line. More specifically, the present invention is concerned with an improved apparatus for measuring the rate of flow of hydraulic solids or a slurry through a flow line, which apparatus is characterized by its accuracy and freedom from velocity errors in any density compensation effected.

The measurement of the net flow rate of hydraulic solids in a flow line presents many problems including the problem of accurately measuring the density of the flowing material. The density measurement is complicated by the fact that the only accurate density measurement that can be made must be made directly in the flow line. This is due to the fact that side chambers and the like used in conventional flow measurements are subject to clogging due to the settlement of the solids from the vehicle which is transporting the solids. In taking a density measurement directly from the flow line, considerable error may be introduced due to the presence of frictions between the flowing hydraulic solids and the walls of the flow pipe. This friction is a factor which varies in accordance with the fluid velocity in the line. Prior art devices have recognized this problem and have had to be compensated by means of velocity correction apparatus or velocity compensating means. These velocity correction and compensation devices are expensive and unduly complicated and do not produce a flow measurement of accuracy commensurate with the high expenditure involved. The present invention is adapted to produce a compensated flow measurement without the necessity of providing a velocity correction or compensation.

It is therefore a further object of the present invention to provide a new and improved hydraulic solids flow meter where a density measurement is made directly in the flow line in such a manner that the density measurement is independent of the velocity of the fluid flowing in the line. As accomplished in the present invention, a density measurement is made in the flow line directly by taking a pressure measurement along a vertical section of a horizontal flow pipe so that the density measurement is made at right angles with respect to the flow of the fluid through the pipe.

It is therefore a further more specific object of the present invention to provide an improved compensated flow measurement wherein a density signal is derived from a flow pipe directly by means of a pair of pressure connections to the pipe along a substantially vertical plane which is at right angles with respect to the flow path in the pipe.

Another more specific object of the present invention is to provide an improved flow measuring apparatus wherein a differential pressure measuring device is used to determine the fluid velocity of a fluid flowing through a pipe and a further differential pressure responsive device is used to determine the density by measuring the head pressures on the fluid in the pipe along a plane which is at right angles to the flow of the fluid in the pipe.

A still further object of the present invention is to provide an improved apparatus for measuring the net solids flow in a hydraulic solids flow line.

Still another object of the present invention is to provide, in cooperation with the foregoing objects, means for isolating the differential pressure responsive means from the flow pipe. That means comprises sediment chambers which prevent the settlement of solids from the pipe in the pressure measuring lines of the differential pressure measuring device.

The various features of novelty which characterize this invention are pointed out with particularity in the claims annexed to and forming a part of this specification. For a better understanding of the invention, its advantages, and specific objects attained with its use, reference should be made to the accompanying drawing and descriptive matter in which there is illustrated and described a preferred embodiment of the invention.

Referring to the single figure, the numeral 10 represents a flow pipe through which is flowing a hydraulic solid. The hydraulic solid generally takes the form of very fine granules or particles of a solid suspended in a transporting vehicle, such as water. In the present form of the invention, it is desired that the net solid flow rate of the hydraulic solid flowing through the pipe 10 be measured.

The velocity of the hydraulic solids flowing through pipe 10 is determined by means of a segmental orifice plate 11 placed within the pipe 10 with a pair of differential pressure conduits 12 and 13 being connected on the opposite sides of the orifice to provide a differential pressure signal source indicative of the velocity of the fluid flowing through the pipe 10. The conduit 12 is connected to a sediment chamber 14 while the conduit 13 is connected to a sediment chamber 15. The sediment chamber 14 has an output pressure connection 16 which leads to a differential pressure measuring device 17 having a filtered air supply referred to in the drawing as F.A.S. The sediment chamber 15 has a pressure connection 18 which also leads to the differential pressure measuring device 17. The output of the device 17 will be a pneumatic pressure which will pass through a conduit 19 to a square root extracting relay 20. This square root extracting relay 20 may well take the form of any known type, such as Sorteberg model A, type FRE. The output of the square root extracting relay is by way of a conduit 21 which is connected to supply a linear velocity signal in pneumatic form to a net solids computing relay 25. This net solids computing relay may also be of any known type, such as the commercially available Sorteberg model A, type RPI. A representative form for the relays 20 and 25 is disclosed in the Sorteberg Patent 2,643,055, issued June 23, 1953.

For measuring the density of the fluid flowing in the pipe 10, there are a pair of differential pressure connections to the pipe 10 at 26 and 27. The conduit 26 connects to a sediment chamber 28 while the conduit 27 connects to a sediment chamber 29. The output of the chamber 28 is by way of a conduit 30 which leads to a differential pressure transmitter 31 that has a filtered air supply F.A.S. The output pressure from the sediment chamber 29 is by way of the conduit 32 which also connects to the differential pressure transmitter 31. The output of the transmitter 31 will be a pneumatic pressure proportional to the density of the fluid in the pipe 10 and will be applied by way of conduit 35 to the net solid computing relay 25. The output of the net solids computing relay 25 is by way of a conduit 36 which leads to a suitable indicating, and/or recording controller instrument 37. The instrument 37 may well be a conventional 3 pen recorder having one pen recording density, another recording flow and a third recording net solids flow. The outputs of the linear flow computer and the density measuring apparatus are accordingly connected directly to the instrument 37. The instrument 37 may further contain a suitable commercially available integrator, or, in other words, a totalizer, the total of which may be observed through a viewing window below the recording chart. This integrator may, for example, be of a type shown in the Eckman Patent 2,556,803, filed December 20, 1944, and issued June 12, 1951. The integrator is preferably connected to the net solids flow pen mechanism to provide an indication of the total flow of solids over a given period of time.

Each of the sediment chambers 14, 15, 28, and 29 are provided with suitable purging means such as inlet water tap 40 and an outlet tap 41. These taps are periodically opened in order to purge the sediment accumulated within the respective chambers so that there will be no interference with the pressure readings taken from the top of the chambers and applied to the respective differential pressure transmitters.

In considering the operation of the present apparatus, it should first be noted that the differential pressure drop across the orifice 11 in the pipe 10 will be indicative of the velocity of the hydraulic solids flowing through the pipe 10. This differential pressure will be applied by way of the sediment chambers 14 and 15 to the differential pressure transmitter 17 which will produce an output proportional to that differential pressure. The output of the differential pressure transmitter 17 is applied by way of conduit 19 to the square root extracting relay 20. The output of the relay 20 will be a pneumatic pressure which varies linearly with the flow changes within the pipe 10.

In order to determine the net amount of solids flowing through the pipe 10 it is necessary to know the density of the fluid flowing through the pipe. The density measurement is obtained by the measurement of the differential pressure existing across a vertical column of the hydraulic solids within the pipe 10. This vertical column is taken directly across the pipe 10 along a vertical line at right angles to the flow of the fluid in the pipe. This will mean that the velocity of the fluid flowing past the connection of the conduit 26 and the connection of the conduit 27 will be the same and there will be no velocity error introduced into the density reading. The differential pressure taken from the head across the pipe 10 will be applied to the respective sediment chambers 28 and 29. The output pressure connections 30 and 32 provide a differential pressure signal on the differential pressure transmitter 31. The output pneumatic pressure from the transmitter 31 in the conduit 35 will vary directly with variations in the density of the material within the pipe 10.

The density of the hydraulic solid is a direct function of the percent solids in the hydraulic solids in the flow line. The linear velocity signal which appears on the output of the square root extraction 20 is a direct measure of the total volume of fluid flowing in the conduit 10 since the cross sectional area of the conduit 10 is a constant. Thus, by multiplying the percent solids times the total volume of flow, it is possible to attain a net solids flow measurement. The multiplying function is accomplished by the computing relay 25 so that the output in conduit 36 will be a direct function of the net solids flowing in the line 10. This will then be indicated and recorded by the instrument 37.

A representative table of specific gravity as it relates to the specific gravity of the hydraulic fluid is shown in the following table.

| Specific gravity | Percent solids |
|---|---|
| 2.6 | 100 |
| 2.2 | 75 |
| 1.8 | 50 |
| 1.4 | 25 |
| 1.0 | 0 |

With a 28" inside diameter pipe at 10, and with a flow of 30 feet per second, there will be flowing through the pipe 10, 40, 321,000 pounds per hour. If the specific gravity of this is 1.400, then the net solids flow rate will be 10,080,000 pounds per hour. This may be integrated by the instrument 37, to produce the total solids flow over a given period of time.

From the foregoing it will be readily apparent that there has been provided a net solids flowmeter which produces a final indication which does not require any correction for velocity errors in the density measuring portion of the apparatus. While a pneumatic form of transmission system has been shown, it will be readily apparent that the principles of the present invention are applicable to electrical as well as hydraulic or mechanical signal transmission.

While, in accordance with the provisions of the statutes, there has been illustrated and described a preferred embodiment of the invention, it will be apparent to those skilled in the art that changes may be made in the forms of the apparatus disclosed without departing from the spirit of the invention as set forth in the appended claims and that in some cases, certain features of the invention may be used to advantage without a corresponding use of other features.

Having now described the invention, what is claimed as new, and for which it is desired to secure by Letters Patent, is:

1. An improved flow meter for measuring the net flow of solids in a horizontal flowing stream of hydraulic solids in a conduit, comprising a first flow transmitter operably connected to produce a first signal which varies linearly and proportionally with the velocity of said hydraulic solids, a second differential pressure transmitter operably connected with said flowing stream to measure the difference in pressure within and adjacent to the upper and lower flow surfaces of said stream at two points which are substantially diametrically opposed to one another and which are substantially at right angles to said flow for producing a second signal that is directly proportional to the density of said solids in said hydraulic fluid flow stream, said improved flow meter further comprising a multiplying apparatus that is solely and directly operably responsive to changes in the magnitude of said first and second signals to continuously produce a third measurable signal whose magnitude is proportional to the rate of flow of the solids in said stream of hydraulic solids.

2. An improved flow meter for measuring the net flow of solids in a horizontal flowing stream of hydraulic solids in a conduit, comprising a first flow transmitter operably connected to produce a first pneumatic signal which varies linearly and proportionally with the velocity of said hydraulic solids, a second differential pressure transmitter operably connected with said flowing stream to measure the difference in pressure within and adjacent to the upper and lower flow surfaces of said stream at two points which are diametrically opposed to one another and which are at right angles to said flow for producing a second pneumatic signal that is directly proportional to the density of said solids in said hydraulic fluid flow stream, said improved flow meter further comprising a multiplying apparatus that is solely and directly operably responsive to changes in the magnitude of said first and second pneumatic signals to continuously produce a third pneumatic measurable signal whose magnitude is proportional to the rate of flow of the solids in said stream of hydraulic solids.

References Cited in the file of this patent

UNITED STATES PATENTS

| | | |
|---|---|---|
| 1,761,295 | Grufield | June 3, 1930 |
| 2,115,520 | Decker | Apr. 26, 1938 |
| 2,207,423 | Weaver | July 9, 1940 |
| 2,287,027 | Cummins | June 23, 1942 |
| 2,417,966 | Binckley | Mar. 25, 1947 |
| 2,644,329 | Redfield | July 7, 1953 |
| 2,746,292 | Vetter | May 22, 1956 |

FOREIGN PATENTS

| | | |
|---|---|---|
| 45,494 | Australia | Jan. 10, 1911 |

OTHER REFERENCES

An article in "Instrumentation," vol. 4, 3rd Quarter 1949, #2, pages 21–25.